Dec. 15, 1964   A. R. BLAKEY, JR   3,160,916
EXTRUDER SCREW
Filed March 12, 1962
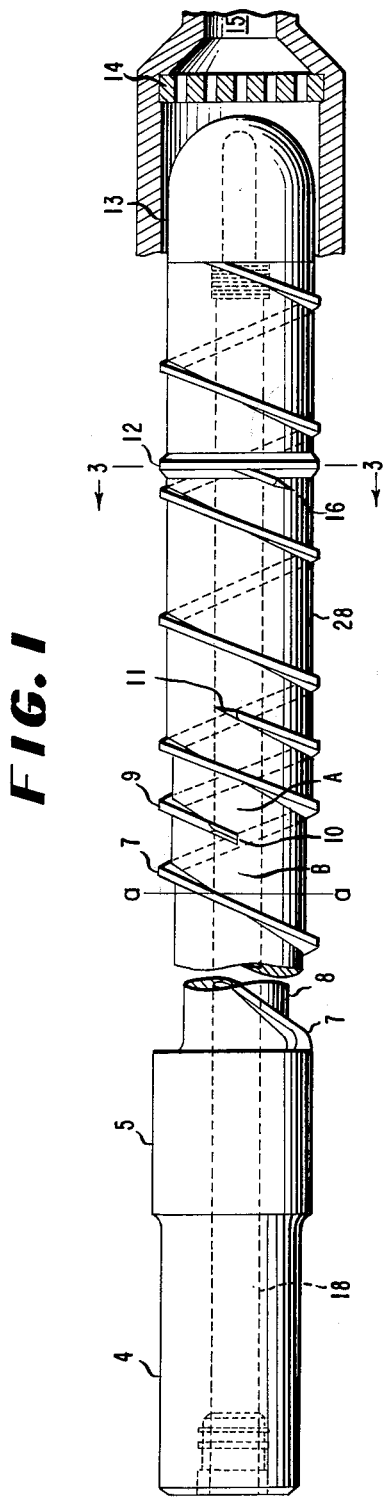
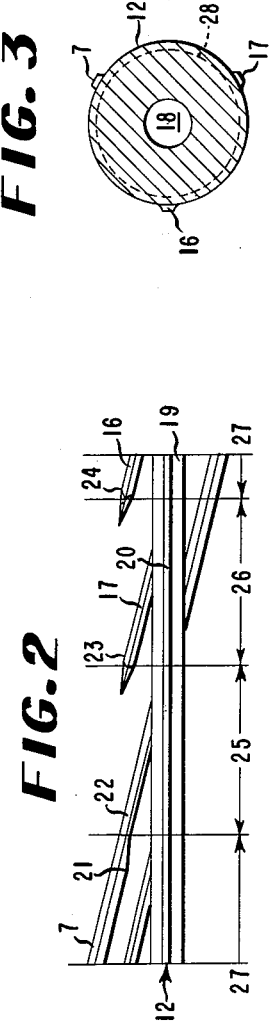
INVENTOR
ANGUS RUCKER BLAKEY, JR.
BY Samuel S. Blight
AGENT

United States Patent Office 3,160,916
Patented Dec. 15, 1964

3,160,916
EXTRUDER SCREW
Angus Rucker Blakey, Jr., Kennett Square, Pa., assignor to E. I. du Pont de Nemours and Company, Wilmington, Del., a corporation of Delaware
Filed Mar. 12, 1962, Ser. No. 178,822
2 Claims. (Cl. 18—12)

This invention relates to a novel screw for use in processing thermoplastic resins, and, more particularly, it relates to an extrusion screw having a rapid compression zone on the down-stream end thereof along with a shear ring arranged so that the compression and shear ring tend to center the screw within the extruder.

Many polymeric materials are obtained directly from their respective processes in the form of a low bulk density solid which must be reprocessed to a form suitable for the fabrication of finished articles. For example, the plastic may be extruded, quenched and cut into molding powder for subsequent employment in injection molding machines. In general, the low bulk density material must undergo substantial compression during the extrusion process, and, for that reason, offers some difficulties in the initial extrusion of the polymer. This low bulk density material has a tendency to bridge across an opening or across a given flight in the screw, thereby interrupting the flow of the fine material and fluff of this nature cannot be satisfactorily compressed until the material can be thrust, i.e. pushed into a zone where it can be mechanically worked or heated to melt the solids. Even though most materials of low bulk density may be melted by contacting the material with a hot surface in extruder design it is preferable to employ mechanical work to melt the fluff since the mechanical parameters may be scaled-up to larger equipment, whereas the direct surface heating of the fluff does not lend itself satisfactorily to scale-up in extruders. Although not limited to devices handling low bulk density material, the expulsion of solid matter in the molten extrudate poses another problem in machines employing mechanical work to melt the particular polymer since heat-transfer through the solid materials must be relied upon when the mechanical energy is brought to bear upon the solid, and this material, once plasticated, must be relied upon to complete the plastication of the remaining solids.

Accordingly, it is an object of the present invention to provide an extruder screw which is especially adapted to handle polymeric materials of low bulk density. Another object of the present invention is to provide an extruder screw which virtually eliminates the expulsion of solid matter in the plasticated stream from the extruder discharge. Still another object of the present invention is to provide an extruder screw which automatically centers itself within an extruder barrel.

The above objects are accomplished by providing an extruder screw having two sections: the first section located on the up-stream portion of the screw and being a gradual compression zone having at least one main channel of a gradually increasing root diameter aligned between a helically disposed flight or flights; the second section of the extruder is a rapid compression zone located on the down-stream end of the screw and having the same root diameter as the root diameter of the first section at their juncture, but thereafter having a rapidly increasing root diameter. The second section in addition to having a main flight similar to the first section has at least one helically disposed auxiliary flight extending from the beginning of the second section through at least one revolution. This auxiliary flight has about the same pitch and hand as the main flight and is spaced at a substantially equal distance from the main flight, or, if more than one auxiliary flight is employed, they are spaced at an equal distance from each other. At or near the termination of the auxiliary flights, a circumferentially disposed shear ring is provided in the second section which momentarily restricts the flow of the thermoplastic thereby increasing the shear several fold at that point. This circumferential ring may be provided with at least two secondary auxiliary flights of substantially the same outside diameter as the main flight, and in addition thereto, which pass over the ring and are substantially equally spaced about its circumference. These secondary auxiliary flights have substantially the same helical disposition and hand as the main flight.

For a more complete understanding of the invention, reference is made to the drawing attached hereto and made a part of this specification in which FIGURE 1 shows a side plan view of the screw of the present invention with a sectional portion of the cross section of an extruder barrel. FIGURE 2 is a developed plan of the shear ring and FIGURE 3 is a cross-sectional view of the screw taken along the lines 3—3 of FIGURE 1. Although this is not essential to the present invention, the preferred material of construction is an alloy steel (for example, "Elastuff" A-2), a stainless steel (for example, type 410), or cold-rolled steel (for example, SAE 4140). One skilled in the art will also recognize that certain hardened skins may be employed on portions of the screw according to the particular use in which the device is placed.

In FIGURE 1, a base 4 to which suitable driving means may be attached is provided on the screw, along with a cylindrical bearing surface 5 which abuts the gradual compression zone having a main flight 7 and a channel 8. At this location, the channel possesses the minimum root diameter in the screw. Most of the gradual compression zone has been removed from the present figure since it is of standard design. In this section, the main flight is disposed at a helical angle of from about 25½° to 14°, while the depth of the channel varies over the screw being about 0.187D at the base and gradually decreases to the end of the zone to about 0.094D. The line $a$—$a$ represents the end of the gradual compression zone, whereupon the main flight 7 is supplemented by an auxiliary flight 9 originating at location 10 and terminating at 11 after traveling one complete revolution of the screw. The rapid compression begins at the origin 10 of the auxiliary flight simultaneously with the main flight on the opposite side of the screw. For example, if it is desired to compress the material in a half revolution of the screw, the compression would begin at location 10 in Channel A (FIGURE 1) and be complete in one half revolution on the far side of the screw. The opposing compression (Channel B) would begin on the far side of the screw, continue for one half revolution and terminate on the near side at location 11. In this manner, the rapid compression forces are directly opposed with no resultant force upon the screw. It should be noted that more than one auxiliary flight may be provided in the rapid compression zone so long as the auxiliary flight or flights and the main flight are substantially equally spaced about the circumference of the screw to insure a balanced force upon rapid compression of the solids. Most of the rapid compression of the solids has been accomplished at the termination of the auxiliary flight at location 11. At this point, most of the materials in the screw are in a molten condition. A shear ring 12 is provided down-stream of the rapid compression zone at any location prior to the tip of the screw 13 over which the plasticated material passes before being forced through the screen 14 and the exit 15 of the extruder. Two secondary auxiliary flights, 16 and 17 (only one of which may be seen in FIGURE 1), are equally spaced from each other and from the main flight 7. These secondary auxiliary flights have approximately the same hand and helical disposition as the main flight. The diameter of the shear ring 12 is slightly less than the diameter of the flight adjacent thereto. Preferably, the diameter of the shear ring may vary from 0.975D to 0.992D and is usually sized to give a 5-10 fold reduction in channel depth as measured on a radial line from the screw root to the flight land. By virtue of this arrangement, a momentary area of extremely high shear rate is created along the screw passageway and serves to plasticate any solids in the stream, thereby rendering the stream a homogenous melt. As discussed hereinafter, the shear ring is provided with auxiliary flights to balance the forces about the ring. The screw may also be provided with an annular passageway 18 into which water may be introduced by a suitable tube (not shown) to affect cooling along the entire screw or to concentrate the cooling effects at any location along the screw in cooperation with suitable insulation. The function of this technique for cooling the screw will be discussed hereinafter.

FIGURE 2 is a developed view about line 3—3 of FIGURE 1 showing the shear ring 12, the secondary auxiliary flights 16 and 17, and the main flight 7. The lower edges 19 of shear ring 12 are contiguous with the channel of the screw. Ridge 20 which may occupy from 0 to 50% of the width of the shear ring represents the highest point of the ring, preferably following within the range of 0.097D to 0.992D. The slope of the sides of the shear ring from ridge 20 to edges 19 may vary considerably in angular disposition as long as well-known streamlining practices are followed. The width of the main flight 7 is decreased at location 21 to location 22 where the reduced width of the main flight is equal to the width of the auxiliary flights 16 and 17 as measured at locations 23 and 24, respectively. The distances 25, 26, and 27, between the main portions of the flights, are equal, and in the present illustration where a total of three flights employed about the shear ring, the angular spacing is 120°. The secondary auxiliary flights 16 and 17 are terminated upon contact with the shear ring 12, but the main flight 7 resumes its travel beyond the shear ring at a width substantially equal to its width before reduction. In order to realize the optimum balance of forces about the shear ring, the secondary auxiliary flights are helically disposed at substantially the same angle as the main flight, however, the angle or disposition of the auxiliary flights need not be exactly the same as the main flight and may be varied from 14 to 25½°. The width of the auxiliary flights is maintained in such a manner that no serious reduction in channel width is realized when the auxiliary channels are employed and may be varied from 0.03 to 0.10D, and, preferably, from 0.04 to 0.06D.

FIGURE 3 is a cross section along the lines 3—3 of FIGURE 1 showing the relative arrangement of the main flight 7, the auxiliary flights 16 and 17, the main body of the screw 28, and the shear ring 12. The annular passageway 18 for the introduction of coolant into the screw may also be seen. The radius of the main flight and the auxiliary flights exceed both the radius of the shear ring 12 and the main body of the screw 28, providing a clearance between the highest point of the flight and the barrel from 0.0015 to 0.005D. The shear ring 12 usually has a diameter of from 0.975D to 0.992D and provides a clearance between the main barrel and the shear ring of 0.005D.

The following example is set forth to illustrate and not to restrict the present invention. The various parts of the screw are referred to by number as set forth in the drawing described hereinabove. The bulk density of the polymers employed was determined by filling a 100 cc. graduate with the polymer, gently tapping the graduate approximately 100 times (about one minute), noting the resulting volume and finally weighing the material.

*Example 1*

A standard 2" extruder having a 10 kw. motor generator and 10 H.P. drive motor arranged to rotate in the direction for right-hand screw, a feed-throat 3" long with the sides intersecting the wall of the extruder barrel below the center line, a valve die for obtaining variable back pressure in the extruder, and a standard die to produce a strand having a substantially circular cross section of from 1/16 to 3/16 inch in diameter was employed to evaluate the extruder screw of the present invention. The over-all length of the screw exclusive of the driving ring 4 and the bearing ring 5 was 37". The gradual compression zone occupied 30" of the length with the distance from the sudden compression zone to the shear ring 12 being 4½". The metering zone, i.e. that portion of the screw from the termination of the sudden compression zone to the end of the screw extended 2½" down-stream of the shear ring. The flight lead was 3.0" at the beginning of the gradual compression zone and changed uniformly throughout to 1.56" at the beginning of the sudden compression zone. The clearance between flight or land and the barrel was 5.0 mils on radius. The channel depth at the beginning of the gradual compression zone was 0.375" and decreased to 0.188" at the beginning of the rapid compression zone. This variance in flight lead and channel depth gave a compression ratio of 1.0 at the beginning of the gradual compression zone and 3.85 at the end. At location 2—2 shown in FIGURE 1, an additional flight was added having a hand equal to that of the main flight and a length equal to one revolution of the screw. The roots of the double flight were arranged so that the compression in one half turn of the screw was 180° out of phase for the two channels. The channel depth decreased over this sudden compression zone from 0.188" as aforementioned to 0.095" changing the compression ratio from 3.85 to 7.55 while the flight leads remained at 1.56. The channel depth remained constant through the remainder of the extruder screw. A shear ring 12 having a width of 1/16 inch at its greatest diameter (location 20 in FIGURE 2) and a clearance between the ring and the barrel of 10 mils on radius was provided 4½" from the termination of the gradual compression zone. Two secondary auxiliary flights having the same lead and hand as the main flight were provided about the shear ring 12 at distances equally spaced from the main flight and from each other. These secondary auxiliary flights as well as the reduced portion of the main flight as discussed above had a width of 0.13 inch and a length equal to 1/3 revolution. The secondary auxiliary flights terminated at the highest point of the shear ring 12. The entire screw was provided with a ½ inch internal bore for introduction of cooling water as described hereinabove and the barrel of the extruder was divided into five approximately equal sections with provisions for electric heat in each section and cooling coils in sections 3, 4 and 5 as viewed from the up-stream to the down-stream end of the barrel. The polymer employed in this example was a high molecular weight polyoxymethylene diacetate having a bulk density of 0.45 gram/cc. The screw was rotated at 50 R.P.M., while feeding polymer to the extruder and the zones adjusted until the temperature profile from zone 1 to zone 5 of 213° C., 204° C., 195° C., and 196° C., respectively, was obtained. The die pressure was adjusted to 900 lbs./sq. inch yielding an output of extrudate at a temperature 201° C. of 235 grams/minute. Water was supplied to the inside of the screw at the temperature of 11° C. and a rate of 90 cc./minute. Under these conditions, the extruder screw plasticated the fluff quite successfully and emitted a homogeneous extrudate through the die which was subsequently cut and cooled to form conventional type of molding powder. In this particular run, the power requirements were quite low as indicated by a current of 44 ampers consumed by the drive at a voltage of 99 volts. Subsequent experiments employing a polyoxymethylene of varying density indicated the output of the above extruder varied directly with the bulk density of polyoxymethylene. For example, material having a bulk density of 0.45 could be extruded at 41.1 pounds/hour at a screw speed of 60 r.p.m. At the same screw speed, material having a bulk density of 0.27 was extruded at 26.4 pounds/hour and material having a bulk density of 0.22 was extruded at a rate of 20.4 pounds/hour. Although the screw of the present invention is capable of delivering a homogenous extrudate by varying the back pressure in the extruder, it has been found more convenient to vary the rate of cooling within the screw, thereby permitting a homogenous extrudate over a range of bulk densities with a minimum of power consumption as compared to the technique of varying back pressure within the machine. For example, at a screw speed of 30 r.p.m. and an extruder output of 144 grams/minute, a homogenous extrudate may be obtained by passing approximately 25 cc. of water/minute through the screw, the water having an inlet temperature of 11° C. and an outlet temperature of about 100° C. However, if no water is applied to the screw at the same speed, the output of the machine, all other adjustments being constant, will increase to about 185 grams/minute with an erratic delivery of extrudate having solids evident therein. As high as 220 cc./minute of water have been passed through the screw at a speed of 30 r.p.m. with the water inlet at 11° C. and the exit 83° C. to produce a satisfactory homogenous extrudate at the rate of 144 grams/minute. It should be apparent that screw cooling may be used to control the quality of the extrudate in place of changing the design of the screw or employing a high back pressure in the machine. It should also become apparent that a wide range of feeds may be employed with the screw of this invention by varying the cooling rate.

Although the foregoing example was limited to the use of polyoxymethylene, the screw of the present invention may process all types of extrudable thermoplastics and should produce equally satisfactory results with those plastics. For processing polyoxymethylene in the extruder of the present invention, it was found that screw speeds from 20 to 80 rounds/minute and a back pressure in the die of 500 to 1500 pounds/square inch gauge could be employed for most of the materials tested. Approximately 1½ to 2 H.P. may be supplied by the barrel heaters over most of the operating range, and depending upon the screw speed and bulk density of the feed, 0 to 2 H.P. may be removed by the screw cooling and 0 to 4 H.P. may be removed by a barrel cooling. The preferred operating temperatures for polyoxymethylene at each section of the screw from the upstream to the downstream end are 215° C., 205° C., and 190° C. for the remaining three locations.

After extended operation of the screw, it was removed from the barrel, and the barrel and screw were inspected for wear, whereupon it was found that a very minimum had taken place during this extended period.

It should be obvious to one skilled in the art that many variations in detail are possible within the purview of the present invention. Obviously, the length of the diameter of the screw can be varied over a wide range, the number of leads, and the pitch and depth of the flights of the gradual compression zone and the rapid compression zone can be varied within the relative limits set forth herein. The screw could be used in combination with other devices to obtain a construction suited to the particular operation to be performed on the resin. Extrusion of thermoplastic resins carried out with the screw of the present invention can be continued for unlimited periods of time with the minimum amount of wear upon the screw and the extruder barrel and without major fluctuation in the quality or temperature of the extrudate. By employing the screw of the present invention, it is possible to employ material of low bulk density for subsequent extrusion into filaments, rods, bars, tubes, wire-coverings, sheets, or the like without preforming the resin into the conventional form of molding powder. Further advantage of this invention is that it can be embodied in existing machines with a minimum of expensive and complicated modifications.

I claim:

1. An extruder screw having two sections; the first section located on the up-stream portion of the screw and being a gradual compression zone having a main channel of gradually increasing root diameter lying within at least one helically disposed main flight; the second section being a rapid compression zone located on the down-stream end of said screw and having a shear ring, at least one channel of a rapidly increasing root diameter with substantially the same root diameter as said first section at their juncture, at least one main flight, at least one helically disposed primary auxiliary flight extending from the beginning of the second section through at least one revolution, having about the same pitch and hand as said main flight and being spaced at a substantially equal distance from said main flight and from each other, and at least two secondary auxiliary flights; said shear ring being circumferentially disposed about the second section down stream of said primary auxiliary flight and arranged to reduce the clearance between the channels and the barrel of the extruder; said secondary auxiliary flights being substantially equally spaced at about an equal distance from said main flight and from each other, having substantially the same outside diameter as the main flight, and extending from a location up stream of said ring to approximately the center portion of the ring and having substantially the same helical disposition and hand as the main flight.

2. An extruder screw especially adapted for the extrusion of thermoplastics having a low bulk density, said screw having two sections; the first section located on the upstream portion of the screw and being a gradual compression zone having the main channel of gradually increasing root diameter with substantially the same helically disposed at an angle of 14° to approximately 25½°; the second section being a rapid compression zone located on the downstream end of said screw and having a shear ring, at least one channel of a rapidly increasing root diameter with substantiallly the same root diameter as said first section at their juncture, at least one main flight, at least one helically diposed, primary auxiliary flight extending from the beginning of said second section through at least one revolution, and having about the same pitch and hand as said main flight and being spaced at substantially equal distance from said main flight and from each other, and at least two secondary auxiliary flights, said shear ring being circumferentially disposed about said second section downstream of said primary auxiliary flight having a diameter of 0.975D to 0.992D wherein D is the outside diameter of the screw, and arranged to reduce the clearance between the channels and the barrel of the extruder; said secondary auxiliary flights being substantially equally spaced at about an equal distance from said main flight and each other, having substantially the same side diameter as said main flight, and extending from a location upstream of said ring to approximately the center portion of said ring and having substantially the same helical disposition and hand as the main flight.

References Cited in the file of this patent

UNITED STATES PATENTS

| | | |
|---|---|---|
| 2,343,529 | Brown | Mar. 7, 1944 |
| 2,480,615 | Strain et al. | Aug. 30, 1949 |
| 2,733,051 | Street | Jan. 31, 1956 |
| 2,838,794 | Munger et al. | June 17, 1958 |

UNITED STATES PATENT OFFICE
CERTIFICATE OF CORRECTION

Patent No. 3,160,916                  December 15, 1964

Angus Rucker Blakey, Jr.

It is hereby certified that error appears in the above numbered patent requiring correction and that the said Letters Patent should read as corrected below.

Column 4, line 62, for "213° C., 204° C., 195° C., and" read -- 213° C., 204° C., 195° C., 195° C., and --; column 6, line 40, for "with substantially the same" read -- lying within one main flight --.

Signed and sealed this 18th day of May 1965.

(SEAL)
Attest:

ERNEST W. SWIDER                  EDWARD J. BRENNER
Attesting Officer                  Commissioner of Patents